US012769833B2

(12) United States Patent
Doubchak et al.

(10) Patent No.: US 12,769,833 B2
(45) Date of Patent: Oct. 20, 2026

(54) RANSOMWARE AND MALICIOUS SOFTWARE PROTECTION IN SSD/UFS BY NVME INSTRUCTIONS LOG ANALYSIS BASED ON MACHINE-LEARNING

(71) Applicant: SAMSUNG ELECTRONICS CO., LTD., Suwon-si (KR)

(72) Inventors: Ariel Doubchak, Suwon-si (KR); Noam Livne, Suwon-si (KR); Amit Berman, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1118 days.

(21) Appl. No.: 17/877,435

(22) Filed: Jul. 29, 2022

(65) Prior Publication Data

US 2024/0037233 A1 Feb. 1, 2024

(51) Int. Cl.

*G06F 21/56* (2013.01)
*G06F 11/14* (2026.01)
*G06N 20/00* (2019.01)

(52) U.S. Cl.

CPC ........ *G06F 21/566* (2013.01); *G06F 11/1415* (2013.01); *G06N 20/00* (2019.01)

(58) Field of Classification Search

CPC .... G06F 21/566; G06F 11/1415; G06F 21/56; G06F 21/602; G06F 21/78; G06F 21/552; G06F 21/572; G06F 21/75; G06F 21/79; G06N 20/00; G06N 3/044; G06N 3/0464; G06N 20/20

See application file for complete search history.

(56) References Cited

U.S. PATENT DOCUMENTS

| | | | | |
|---|---|---|---|---|
| 11,032,259 | B1 * | 6/2021 | Bernat | H04L 9/0822 |
| 11,120,131 | B2 * | 9/2021 | Chen | G06F 21/56 |
| 11,449,749 | B2 * | 9/2022 | Meiri | G06F 16/128 |
| 11,947,568 | B1 * | 4/2024 | Danz | G06F 16/284 |
| 12,457,293 | B1 * | 10/2025 | Botner | H04L 65/1079 |
| 2018/0007069 | A1 * | 1/2018 | Hunt | H04L 63/1408 |

(Continued)

FOREIGN PATENT DOCUMENTS

| | | | | |
|---|---|---|---|---|
| CN | 101763272 A | * 6/2010 | | G06F 8/65 |
| CN | 110298174 A | * 10/2019 | | G06F 21/56 |

(Continued)

OTHER PUBLICATIONS

Machine translation of Liu, CN 114741091 A, 1 page (Year: 2022).*

(Continued)

*Primary Examiner* — Christopher A Revak
(74) *Attorney, Agent, or Firm* — Sughrue Mion, PLLC

(57) ABSTRACT

A storage system, including a host device; and a storage device including a memory and at least one processor configured to implement a storage internal protection (SIP) module, wherein the SIP module is configured to: obtain, from the host device, a plurality of storage commands corresponding to the memory, filter the plurality of storage commands to obtain a filtered plurality of storage commands, apply information about the filtered plurality of storage commands to a machine-learning ransomware detection algorithm, and based on the machine-learning ransomware detection algorithm indicating that a ransomware operation is detected, provide a notification to the host device.

20 Claims, 12 Drawing Sheets

(56) References Cited

U.S. PATENT DOCUMENTS

| | | | | |
|---|---|---|---|---|
| 2018/0343275 | A1* | 11/2018 | Moon | G06F 21/554 |
| 2019/0034633 | A1* | 1/2019 | Seetharamaiah | G06F 9/45558 |
| 2021/0216871 | A1* | 7/2021 | Zhang | G06N 3/045 |
| 2022/0398316 | A1* | 12/2022 | Castrejon, III | G06F 21/552 |
| 2023/0096895 | A1* | 3/2023 | Stokes, III | G06F 21/566 726/22 |
| 2024/0330434 | A1* | 10/2024 | Strogov | G06F 21/52 |

FOREIGN PATENT DOCUMENTS

| | | | | | |
|---|---|---|---|---|---|
| CN | 114460913 | A | * | 5/2022 | G05B 23/0213 |
| CN | 114741091 | A | * | 7/2022 | G06F 9/44521 |
| WO | WO-2024033608 | A1 | * | 2/2024 | G06F 21/566 |

OTHER PUBLICATIONS

Machine translation of Li, CN 114460913 A, 1 page (Year: 2022).*
Machine translation of Li, CN 110298174 A, 1 page (Year: 2019).*
Machine translation of Wu, CN 101763272 A, 1 page (Year: 2010).*

* cited by examiner

15

2000

RANSOMWARE AND MALICIOUS SOFTWARE PROTECTION IN SSD/UFS BY NVME INSTRUCTIONS LOG ANALYSIS BASED ON MACHINE-LEARNING

BACKGROUND

1. Field

Apparatuses and methods consistent with embodiments relate to protection of storage devices, more particularly a detecting malicious ransomware operations.

2. Description of Related Art

Malicious software such as malware can come in many forms. One type of malware that has become increasingly common is referred to as ransomware. Ransomware may target any type of computer system, for example personal computers which may use operating systems such as Microsoft Windows and Apple iOS, mobile devices such as smartphones, which may include iPhones and Android-based smartphones, servers, and any other type of device.

Generally, ransomware may refer to malware which denies a user access to data stored on the user's device, and demands payment for restoration of access to the data. For example, locker ransomware may lock the user's device entirely, and only unlock the device when payment is received by the attacker. Cryptoransomware may encrypt some or all of the data stored on the user's device, and the attacker may offer a decryption key to the user in exchange for payment. Other types of ransomware may steal data from the user's device and threaten to publish the data if payment is not received. Payment may be demanded using, for example prepaid online payment cards such as Paysafecard, or cryptocurrencies such as Bitcoin.

Recently, the number of cryptoransomware attacks have increased significantly. A cryptoransomware attack may proceed in one or more phases. For example, a ransomware attack may begin with a distribution campaign which may distribute a download dropper for the malware using, for example, social engineering techniques or weaponized websites. The malicious code associated with the ransomware may then infect the user's device, for example by downloading an executable which may install the ransomware. This may be followed by malicious payload staging, in which the ransomware is established and embedded on the device, and may exhibit persistency. Then, the ransomware may scan the device to locate data targets, which may be stored locally or in network accessible resources. Then, the targeted data may be encrypted, and a ransom message may be provided to the user demanding payment and providing instructions to the user for providing the payment.

The targeted data may include, for example, all data of the device, or may include a smaller subset of the data. For example, the ransomware may target specific file extensions such as ".doc", ".jpg", ".pdf", or files containing text documents, presentations, or images, or any other personal data. The targeted data may include large amounts of data, such as several gigabytes, and the encryption process may proceed quickly, for example in just a few seconds or minutes.

Strategies for mitigating ransomware may include two main components: detection and recovery. Generally, strategies which concentrate mainly on recovery may require a large amount of storage and computing capacity. Strategies which concentrate mainly on detection, or a combination of detection and recovery, may reduce the amount of storage and computing capacity which may be required to mitigate a ransomware attack.

Further, current protections against cyber-attacks are located mostly in the software layer, for example in antivirus or firewall software, which may be insufficient to protect against all malicious attacks such as ransomware attacks.

As a result, there is a need for techniques for improved detection of malicious attacks such as ransomware attacks which lock, encrypt, or otherwise deny access to or control over data stored on the victim's storage device.

SUMMARY

In accordance with an aspect of the disclosure, a storage system includes a host device; and a storage device including a memory and at least one processor configured to implement a storage internal protection (SIP) module, wherein the SIP module is configured to: obtain, from the host device, a plurality of storage commands corresponding to the memory, filter the plurality of storage commands to obtain a filtered plurality of storage commands, apply information about the filtered plurality of storage commands to a machine-learning ransomware detection algorithm, and based on the machine-learning ransomware detection algorithm indicating that a ransomware operation is detected, provide a notification to the host device.

In accordance with an aspect of the disclosure, a storage device includes a memory; and at least one processor configured to: obtain a plurality of storage commands corresponding to the memory, filter the plurality of storage commands to obtain a filtered plurality of storage commands, apply information about the filtered plurality of storage commands to a machine-learning ransomware detection algorithm, and based on the machine-learning ransomware detection algorithm indicating that a ransomware operation is detected, provide a notification to a user of the storage device.

In accordance with an aspect of the disclosure, a method of controlling a storage system, is performed by a storage internal protection (SIP) module implemented by at least one processor included in a storage device of the storage system, and includes: obtaining, from a host device included in the storage system, a plurality of storage commands corresponding to a memory of the storage device, filtering the plurality of storage commands to obtain a filtered plurality of storage commands, applying information about the filtered plurality of storage commands to a machine-learning ransomware detection algorithm, and based on the machine-learning ransomware detection algorithm indicating that a ransomware operation is detected, providing a notification to the host device.

In accordance with an aspect of the disclosure, a method of controlling a storage device, is performed by at least one processor and includes obtaining a plurality of storage commands corresponding to a memory included in the storage device, filtering the plurality of storage commands to obtain a filtered plurality of storage commands, applying information about the filtered plurality of storage commands to a machine-learning ransomware detection algorithm, and based on the machine-learning ransomware detection algorithm indicating that a ransomware operation is detected, providing a notification to a user of the storage device.

DETAILED DESCRIPTION

Figure 1:
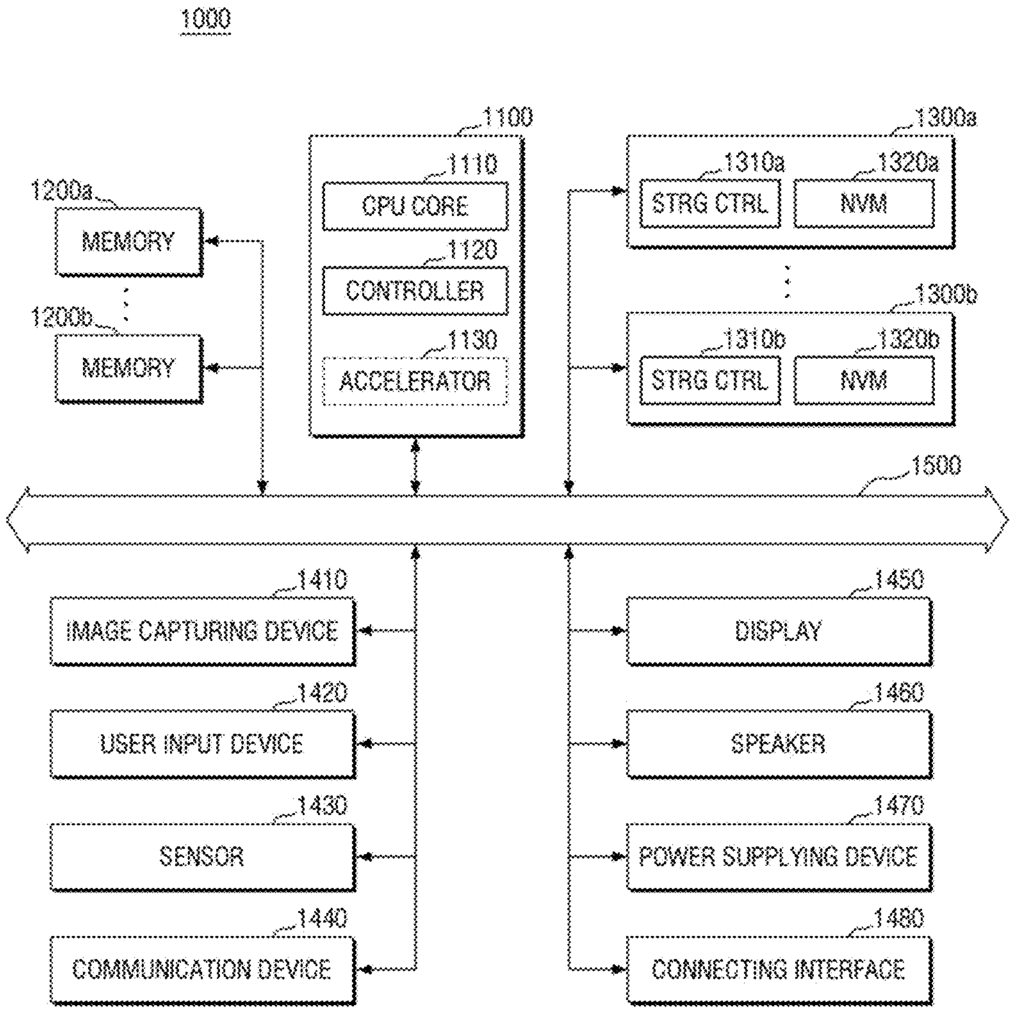
FIG. 1 is a block diagram of a computer system, according to embodiments.

As discussed above, there is a need for protection against cyber-attacks that use a victim's storage device, for example a solid state drive (SSD) storage device, by locking the storage device or encrypting data stored on the storage device. Further, there is a need for Accordingly, embodiments may relate to an SSD which includes internal protection against ransomware attacks. In embodiments, a storage device may detect potential ransomware-related activity that is performed using the storage device, and may alert the user, who can then take action if needed.

For example, embodiments may provide systems, methods, and devices which protect a storage device against cyber-attacks such as ransomware, which may involve loss or theft of data stored on the storage device. In embodiments, a protection layer may be added inside a storage device such as an SSD. This protection layer may detect the ransomware as it begins acting based on SSD activity. For example, the protection layer may sniff the input and output commands to the storage device, for example using the NVMe protocol, and analyze them. Machine-learning algorithms may be employed to detect use of the storage device for ransomware-related activity. In embodiments, based on such ransomware-related activity being detected, an alert corresponding to the ransomware-related activity may be passed to a software application monitoring the storage device.

As a result, a user or owner of the storage device may be alerted that potential ransomware activity takes place on the storage device. Then, the user can take action to stop the activity, for example if the activity is not intended. The detection of threats may be performed, for example, based on the NVMe communication protocol.

Accordingly, embodiments may provide advantages over protections which reside only in the software layer, for example antivirus or firewall software. For example, software-only protections may require different implementations corresponding to multiple different operating systems or computer hardware configurations. In addition, hackers and other creators of malicious software may have significant experience evading such software-only protections.

In contrast, embodiments may provide ransomware protection that is compatible across multiple platforms. In addition, embodiments may reduce a workload of a central processing unit (CPU) of a host by performing, in the storage device, operations that would otherwise be required to be performed by the CPU. Also, embodiments may have access to information that may not be available to software-only protections, for example data included in logically-erased blocks, and therefore may provide increased malware detection and data recovery capabilities.

Further, embodiments may provide advantages over protections which detect malicious code based on suspicious behavior such as requests to access data that should not be accessed. For example, embodiments may analyze storage access behavior to detect patterns in the storage access, for example patterns in write operations, read operations, or erase operations, which may indicate malware such as ransomware.

Although description is provided herein in relation to ransomware detection, embodiments are not limited thereto. For example, embodiments may provide detection of and protection against any type of malware, as desired.

For example, several new cryptocurrencies, for example Filecoin and Chia, use storage resources for their mining, instead of computational resources as for Bitcoin. A crypto-mining attack based on such a cryptocurrency could have devastating effects on a victim's storage device, for example an SSDstorage device. In general, storage commands such as Non-Volatile Memory express (NVMe) commands to an SSD, may be executed without any monitoring or filtering. Accordingly, malicious software such as malware can perform storage based crypto-currency mining, occupy storage space on the SSD, and degrade its health by performing multiple program/erase (P/E) cycles. For example, using a victim's SSD device to prepare for Chia mining, a procedure called plotting, can significantly degrade the device's performance, and easily exceed the device's specifications for Terabytes Written, or even wear it out completely in a matter of weeks.

Accordingly, embodiments may be used to detect malicious cryptographic mining or crypto-mining, which may be referred to as crypto-jacking. In embodiments, crypto-mining relates to any operations related to various cryptocurrencies, including but not limited to mining, performing hash operations, storing user data, plotting, farming, etc. In embodiments, based on such crypto-mining being detected, an alert corresponding to the crypto-mining activity may be passed to a software application monitoring the storage device.

FIG. 1 is a diagram of a system 1000 to which embodiments may be applied. The system 1000 of FIG. 1 may be, for example, a mobile system, such as a portable communication terminal (e.g., a mobile phone), a smartphone, a tablet personal computer (PC), a wearable device, a healthcare device, or an Internet of things (JOT) device. However, the system 1000 of FIG. 1 is not necessarily limited to the mobile system and may be a PC, a laptop computer, a server, a media player, or an automotive device (e.g., a navigation device).

Referring to FIG. 1, the system 1000 may include a main processor 1100, memories (e.g., 1200*a* and 1200*b*), and storage devices (e.g., 1300*a* and 1300*b*). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200*a* and 1200*b* and/or the storage devices 1300*a* and 1300*b*. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200*a* and 1200*b* may be used as main memory devices of the system 1000. Although each of the memories 1200*a* and 1200*b* may include a volatile memory, such as static random access memory (SRAM) and/or dynamic RAM (DRAM), each of the memories 1200*a* and 1200*b* may include non-volatile memory, such as a flash memory, phase-change RAM (PRAM) and/or resistive RAM (RRAM). The memories 1200*a* and 1200*b* may be implemented in the same package as the main processor 1100.

The storage devices 1300*a* and 1300*b* may serve as non-volatile storage devices configured to store data regardless of whether power is supplied thereto, and have larger storage capacity than the memories 1200*a* and 1200*b*. The storage devices 1300*a* and 1300*b* may respectively include storage controllers (STRG CTRL) 1310*a* and 1310*b* and Non-Volatile Memories (NVMs) 1320*a* and 1320*b* configured to store data via the control of the storage controllers 1310*a* and 1310*b*. Although the NVMs 1320*a* and 1320*b* may include flash memories having a two-dimensional (2D) structure or a three-dimensional (3D) V-NAND structure, embodiments are not limited thereto, and the NVMs 1320*a* and 1320*b* may include other types of NVMs, such as PRAM and/or RRAM.

The storage devices 1300*a* and 1300*b* may be physically separated from the main processor 1100 and included in the system 1000 or implemented in the same package as the main processor 1100. In addition, the storage devices 1300*a* and 1300*b* may have types of SSDs or memory cards, and may be removably combined with other components of the system 1000 through an interface, such as the connecting interface 1480 described below. The storage devices 1300*a* and 1300*b* may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 2:
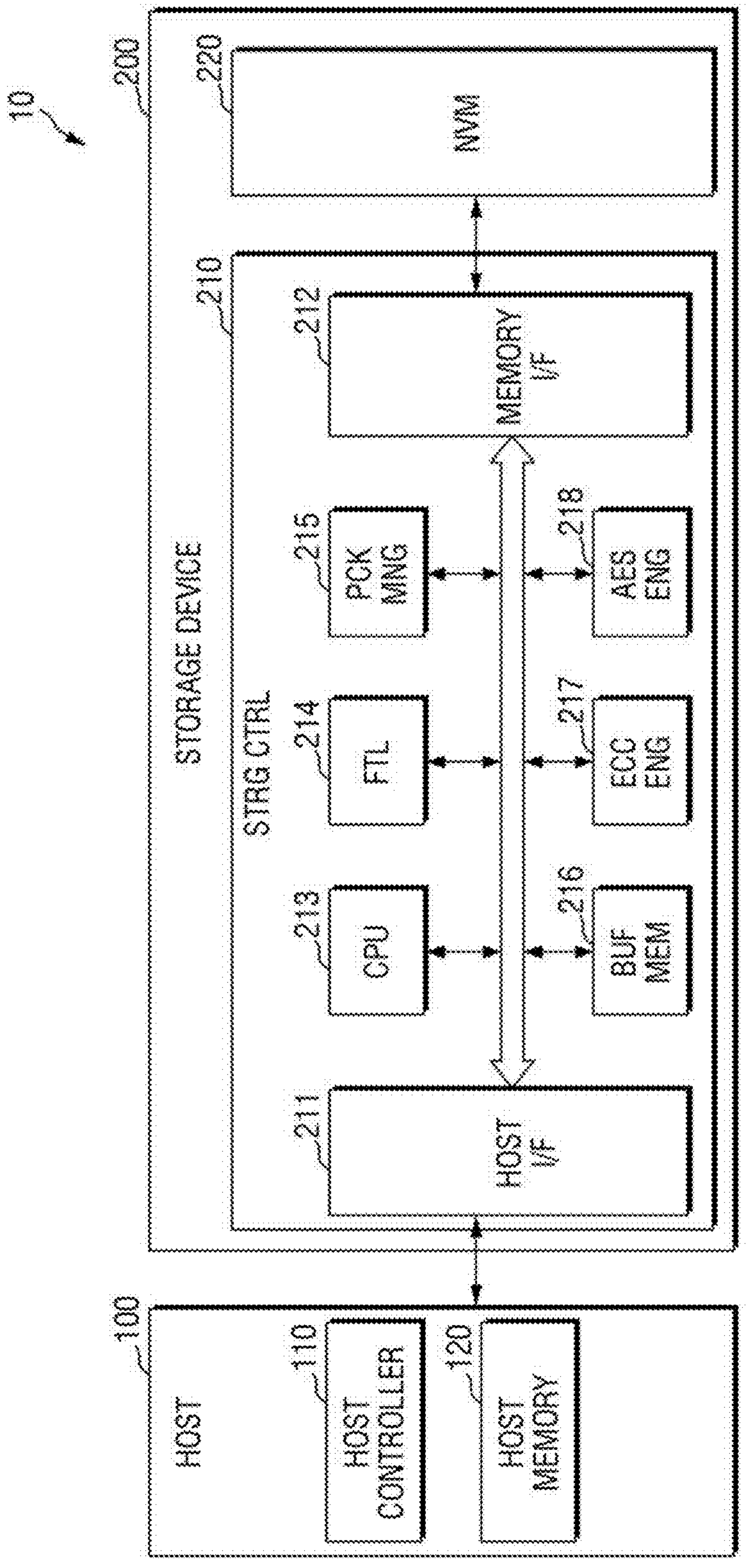
FIG. 2 is a block diagram of a host storage system, according to embodiments.

FIG. 2 is a block diagram of a host storage system 10 according to an example embodiment.

The host storage system 10 may include a host 100 and a storage device 200. Further, the storage device 200 may include a storage controller 210 and an NVM 220. According to an example embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to embodiments, the host controller 110 and the host memory 120 may be implemented as separate semiconductor chips. In some embodiments, the host controller 110 and the host memory 120 may be integrated in the same semiconductor chip. As an example, the host controller

110 may be any one of a plurality of modules included in an application processor (AP). The AP may be implemented as a System on Chip (SoC). Further, the host memory 120 may be an embedded memory included in the AP or an NVM or memory module located outside the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, and a CPU 213. Further, the storage controllers 210 may further include a flash translation layer (FTL) 214, a packet manager 215, a buffer memory 216, an error correction code (ECC) engine 217, and an advanced encryption standard (AES) engine 218. The storage controllers 210 may further include a working memory (not shown) in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as Toggle or open NAND flash interface (ONFI).

The FTL 214 may perform various functions, such as an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controllers 210, the buffer memory 216 may be outside the storage controllers 210.

The ECC engine 217 may perform error detection and correction operations on read data read from the NVM 220. More specifically, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

Figure 3:
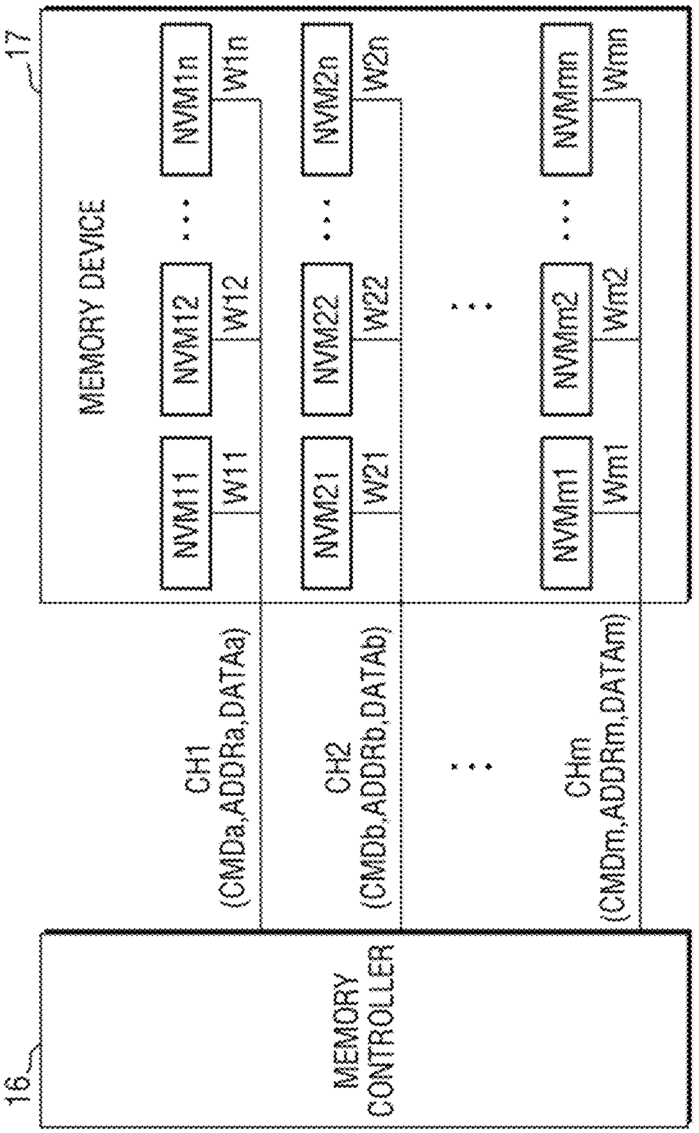
FIG. 3 is a block diagram of a memory system, according to embodiments.

FIG. 3 is a block diagram of a memory system 15 according embodiments. Referring to FIG. 3, the memory system 15 may include a memory device 17 and a memory controller 16. The memory system 15 may support a plurality of channels CH1 to CHm, and the memory device 17 may be connected to the memory controller 16 through the plurality of channels CH1 to CHm. For example, the memory system 15 may be implemented as a storage device, such as an SSD.

The memory device 17 may include a plurality of NVM devices NVM11 to NVMmn. Each of the NVM devices NVM11 to NVMmn may be connected to one of the plurality of channels CH1 to CHm through a way corresponding thereto. For instance, the NVM devices NVM11 to NVM1*n* may be connected to a first channel CH1 through ways W11 to Win, and the NVM devices NVM21 to NVM2*n* may be connected to a second channel CH2 through ways W21 to W2*n*. In an example embodiment, each of the NVM devices NVM11 to NVMmn may be implemented as an arbitrary memory unit that may operate according to an individual command from the memory controller 16. For example, each of the NVM devices NVM11 to NVMmn may be implemented as a chip or a die, but the inventive concept is not limited thereto.

The memory controller 16 may transmit and receive signals to and from the memory device 17 through the plurality of channels CH1 to CHm. For example, the memory controller 16 may transmit commands CMDa to CMDm, addresses ADDRa to ADDRm, and data DATAa to DATAm to the memory device 17 through the channels CH1 to CHm or receive the data DATAa to DATAm from the memory device 17.

The memory controller 16 may select one of the NVM devices NVM11 to NVMmn, which is connected to each of the channels CH1 to CHm, by using a corresponding one of the channels CH1 to CHm, and transmit and receive signals to and from the selected NVM device. For example, the memory controller 16 may select the NVM device NVM11 from the NVM devices NVM11 to NVM1*n* connected to the first channel CH1. The memory controller 16 may transmit the command CMDa, the address ADDRa, and the data DATAa to the selected NVM device NVM11 through the first channel CH1 or receive the data DATAa from the selected NVM device NVM11.

The memory controller 16 may transmit and receive signals to and from the memory device 17 in parallel through different channels. For example, the memory controller 16 may transmit a command CMDb to the memory device 17 through the second channel CH2 while transmitting a command CMDa to the memory device 17 through the first channel CH1. For example, the memory controller 16 may receive data DATAb from the memory device 17 through the second channel CH2 while receiving data DATAa from the memory device 17 through the first channel CH1.

The memory controller 16 may control all operations of the memory device 17. The memory controller 16 may transmit a signal to the channels CH1 to CHm and control each of the NVM devices NVM11 to NVMmn connected to the channels CH1 to CHm. For instance, the memory controller 16 may transmit the command CMDa and the address ADDRa to the first channel CH1 and control one selected from the NVM devices NVM11 to NVM1*n*.

Each of the NVM devices NVM11 to NVMmn may operate via the control of the memory controller 16. For example, the NVM device NVM11 may program the data DATAa based on the command CMDa, the address ADDRa, and the data DATAa provided to the first channel CH1. For example, the NVM device NVM21 may read the data DATAb based on the command CMDb and the address ADDb provided to the second channel CH2 and transmit the read data DATAb to the memory controller 16.

Although FIG. 3 illustrates an example in which the memory device 17 communicates with the memory controller 16 through m channels and includes n NVM devices corresponding to each of the channels, the number of channels and the number of NVM devices connected to one channel may be variously changed.

Figure 4:
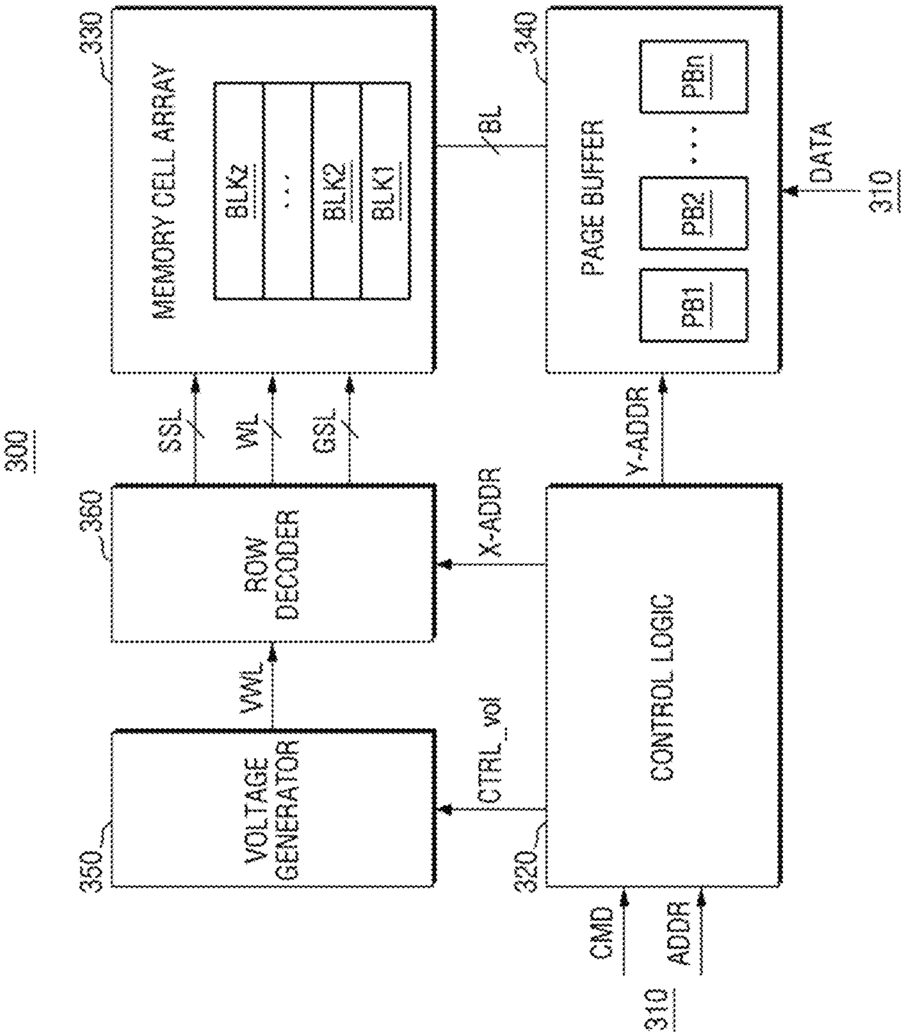
FIG. 4 is a block diagram of a memory device, according to embodiments.

FIG. 4 is a block diagram of a memory device 300 according to an example embodiment. Referring to FIG. 4, the memory device 300 may include a control logic circuitry 320, a memory cell array 330, a page buffer 340, a voltage generator 350, and a row decoder 360. Although not shown in FIG. 4, the memory device 300 may further include a memory interface circuitry 310 shown in FIG. 6. In addition, the memory device 300 may further include a column logic, a pre-decoder, a temperature sensor, a command decoder, and/or an address decoder.

The control logic circuitry 320 may control all various operations of the memory device 300. The control logic circuitry 320 may output various control signals in response to commands CMD and/or addresses ADDR from the memory interface circuitry 310. For example, the control logic circuitry 320 may output a voltage control signal CTRL vol, a row address X-ADDR, and a column address Y-ADDR.

The memory cell array 330 may include a plurality of memory blocks BLK1 to BLKz (here, z is a positive integer), each of which may include a plurality of memory cells. The memory cell array 330 may be connected to the page buffer 340 through bit lines BL and be connected to the row decoder 360 through word lines WL, string selection lines SSL, and ground selection lines GSL.

In an example embodiment, the memory cell array 330 may include a 3D memory cell array, which includes a plurality of NAND strings. Each of the NAND strings may include memory cells respectively connected to word lines vertically stacked on a substrate. The disclosures of U.S. Pat. Nos. 7,679,133; 8,553,466; 8,654,587; 8,559,235; and US Pat. Pub. No. 2011/0233648 are hereby incorporated by reference. In an example embodiment, the memory cell array 330 may include a 2D memory cell array, which includes a plurality of NAND strings arranged in a row direction and a column direction.

The page buffer 340 may include a plurality of page buffers PB1 to PBn (here, n is an integer greater than or equal to 3), which may be respectively connected to the memory cells through a plurality of bit lines BL. The page buffer 340 may select at least one of the bit lines BL in response to the column address Y-ADDR. The page buffer 340 may operate as a write driver or a sense amplifier according to an operation mode. For example, during a program operation, the page buffer 340 may apply a bit line voltage corresponding to data to be programmed, to the selected bit line. During a read operation, the page buffer 340 may sense current or a voltage of the selected bit line BL and sense data stored in the memory cell.

The voltage generator 350 may generate various kinds of voltages for program, read, and erase operations based on the voltage control signal CTRL vol. For example, the voltage generator 350 may generate a program voltage, a read voltage, a program verification voltage, and an erase voltage as a word line voltage VWL.

The row decoder 360 may select one of a plurality of word lines WL and select one of a plurality of string selection lines SSL in response to the row address X-ADDR. For example, the row decoder 360 may apply the program voltage and the program verification voltage to the selected word line WL during a program operation and apply the read voltage to the selected word line WL during a read operation.

Figure 5:
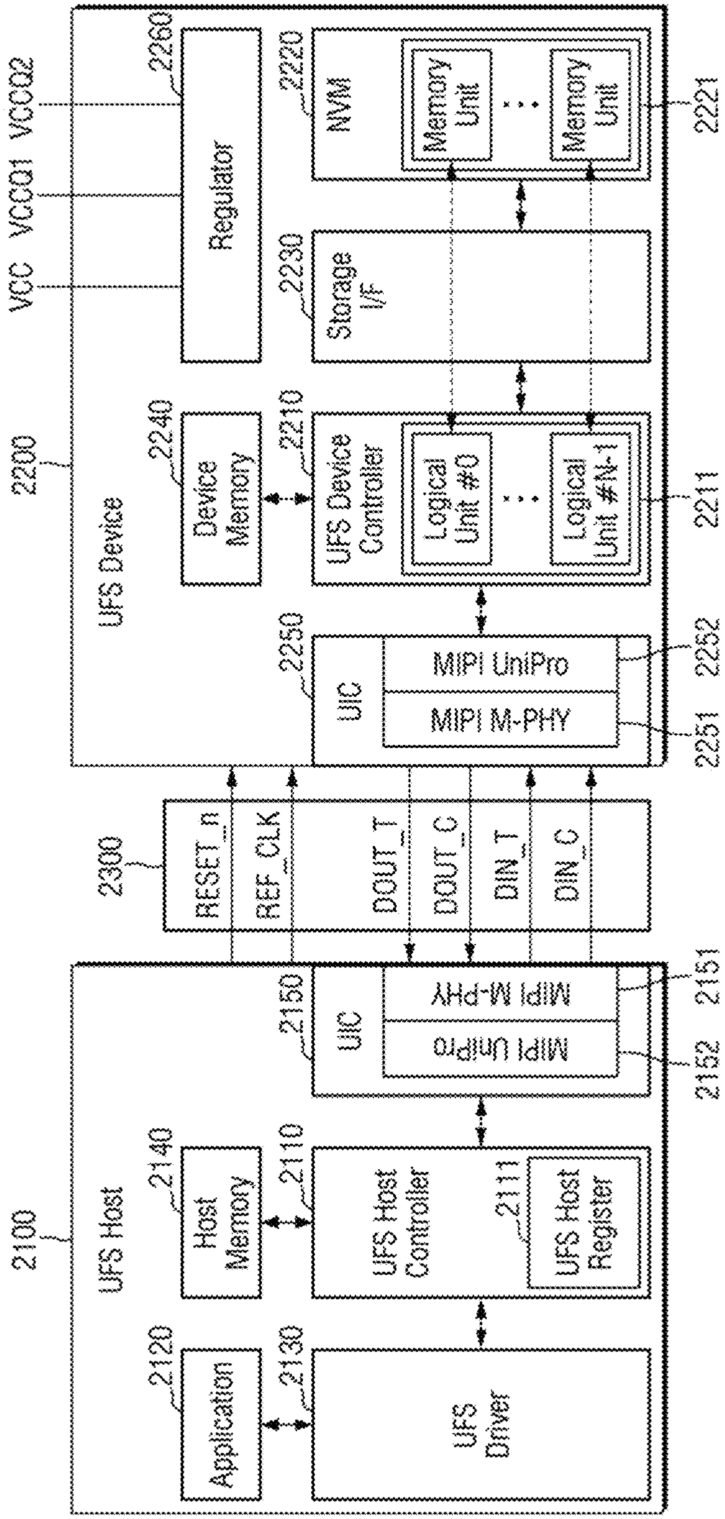
FIG. 5 is a block diagram of a UFS system, according to embodiments.

FIG. 5 is a diagram of a UFS system 2000 according to embodiments. The UFS system 2000 may be a system conforming to a UFS standard announced by Joint Electron Device Engineering Council (JEDEC) and include a UFS host 2100, a UFS device 2200, and a UFS interface 2300. The above description of the system 1000 of FIG. 1 may also be applied to the UFS system 2000 of FIG. 5 within a range that does not conflict with the following description of FIG. 5.

Referring to FIG. 5, the UFS host 2100 may be connected to the UFS device 2200 through the UFS interface 2300. When the main processor 1100 of FIG. 1 is an AP, the UFS host 2100 may be implemented as a portion of the AP. The UFS host controller 2110 and the host memory 2140 may respectively correspond to the controller 1120 of the main processor 1100 and the memories 1200*a* and 1200*b* of FIG. 1. The UFS device 2200 may correspond to the storage device 1300*a* and 1300*b* of FIG. 1, and a UFS device controller 2210 and an NVM 2220 may respectively correspond to the storage controllers 1310*a* and 1310*b* and the NVMs 1320*a* and 1320*b* of FIG. 1.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 5, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be 8, without being limited thereto. The UFS device controller 2210 may include an FTL and convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information of the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an ECC engine (not shown) embedded therein. More specifically, the ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an AES engine (not shown). The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is a single-level cell (SLC) configured to store 1-bit information, each of the memory cells may be a cell configured to store information of 2 bits or more, such as a multi-level cell (MLC), a triple-level cell (TLC), and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 6:
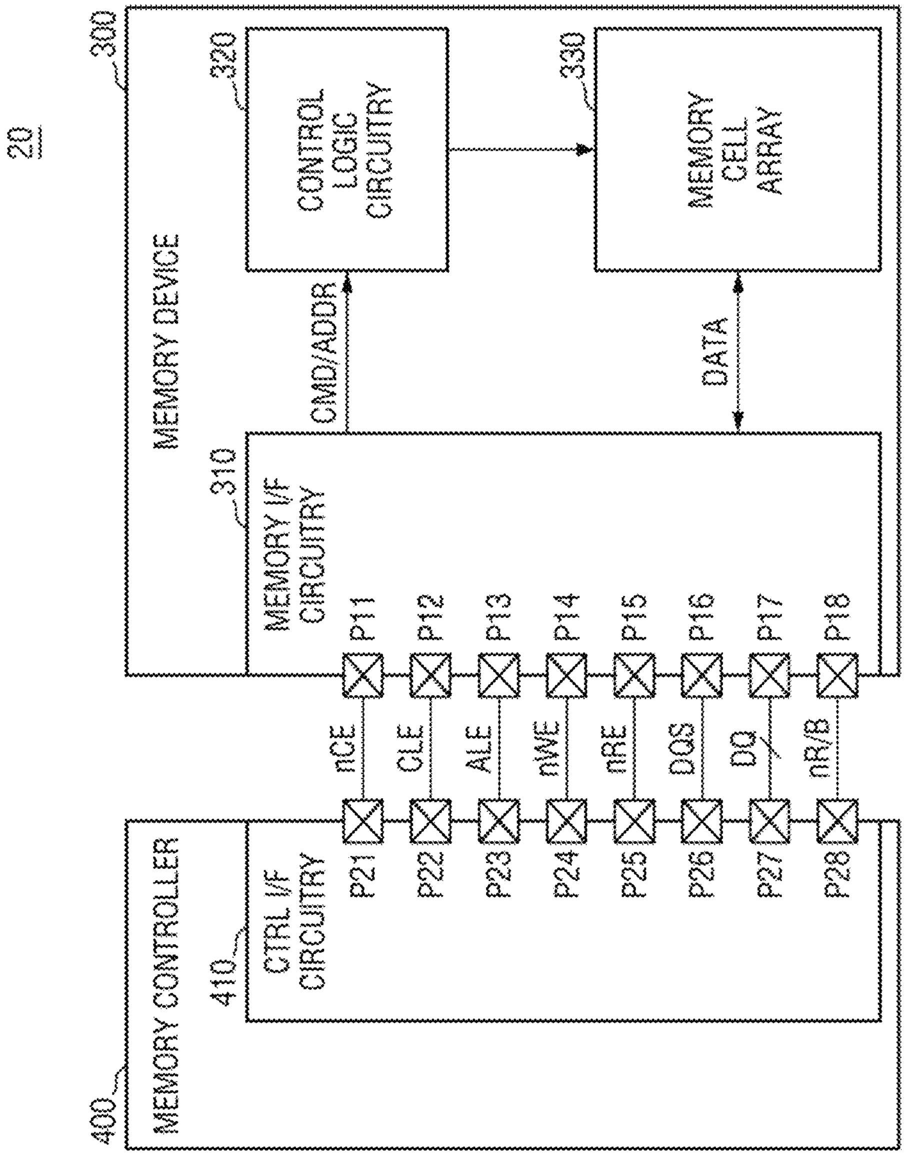
FIG. 6 is a block diagram of a memory system, according to embodiments.

FIG. 6 is a block diagram of a memory system 20 according to embodiments. Referring to FIG. 6, the memory system 20 may include a memory device 300 and a memory controller 400. The memory device 300 may correspond to one of NVM devices NVM11 to NVMmn, which communicate with a memory controller 200 based on one of the plurality of channels CH1 to CHm of FIG. 3. The memory controller 400 may correspond to the memory controller 200 of FIG. 3.

The memory device 300 may include first to eighth pins P11 to P18, a memory interface circuitry 310, a control logic circuitry 320, and a memory cell array 330.

The memory interface circuitry 310 may receive a chip enable signal nCE from the memory controller 400 through the first pin P11. The memory interface circuitry 310 may transmit and receive signals to and from the memory controller 400 through the second to eighth pins P12 to P18 in response to the chip enable signal nCE. For example, when the chip enable signal nCE is in an enable state (e.g., a low level), the memory interface circuitry 310 may transmit and receive signals to and from the memory controller 400 through the second to eighth pins P12 to P18.

The memory interface circuitry 310 may receive a command latch enable signal CLE, an address latch enable signal ALE, and a write enable signal nWE from the memory controller 400 through the second to fourth pins P12 to P14. The memory interface circuitry 310 may receive a data signal DQ from the memory controller 400 through the seventh pin P17 or transmit the data signal DQ to the memory controller 400. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ(s).

The memory interface circuitry 310 may obtain the command CMD from the data signal DQ, which is received in an enable section (e.g., a high-level state) of the command latch enable signal CLE based on toggle time points of the write enable signal nWE. The memory interface circuitry 310 may obtain the address ADDR from the data signal DQ, which is received in an enable section (e.g., a high-level state) of the address latch enable signal ALE based on the toggle time points of the write enable signal nWE.

In an example embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 310 may obtain the command CMD or the address ADDR based on toggle time points of the write enable signal nWE.

The memory interface circuitry 310 may receive a read enable signal nRE from the memory controller 400 through the fifth pin P15. The memory interface circuitry 310 may receive a data strobe signal DQS from the memory controller 400 through the sixth pin P16 or transmit the data strobe signal DQS to the memory controller 400.

In a data (DATA) output operation of the memory device 300, the memory interface circuitry 310 may receive the read enable signal nRE, which toggles through the fifth pin P15, before outputting the data DATA. The memory interface circuitry 310 may generate the data strobe signal DQS, which toggles based on the toggling of the read enable signal nRE. For example, the memory interface circuitry 310 may generate a data strobe signal DQS, which starts toggling after a predetermined delay (e.g., tDQSRE), based on a toggling start time of the read enable signal nRE. The memory interface circuitry 310 may transmit the data signal DQ including the data DATA based on a toggle time point of the data strobe signal DQS. Thus, the data DATA may be aligned with the toggle time point of the data strobe signal DQS and transmitted to the memory controller 400.

In a data (DATA) input operation of the memory device 300, when the data signal DQ including the data DATA is received from the memory controller 400, the memory interface circuitry 310 may receive the data strobe signal DQS, which toggles, along with the data DATA from the memory controller 400. The memory interface circuitry 310 may obtain the data DATA from the data signal DQ based on toggle time points of the data strobe signal DQS. For example, the memory interface circuitry 310 may sample the data signal DQ at rising and falling edges of the data strobe signal DQS and obtain the data DATA.

The memory interface circuitry 310 may transmit a ready/busy output signal nR/B to the memory controller 400 through the eighth pin P18. The memory interface circuitry 310 may transmit state information of the memory device 300 through the ready/busy output signal nR/B to the memory controller 400. When the memory device 300 is in a busy state (i.e., when operations are being performed in the memory device 300), the memory interface circuitry 310 may transmit a ready/busy output signal nR/B indicating the busy state to the memory controller 400. When the memory device 300 is in a ready state (i.e., when operations are not performed or completed in the memory device 300), the memory interface circuitry 310 may transmit a ready/busy output signal nR/B indicating the ready state to the memory controller 400. For example, while the memory device 300 is reading data DATA from the memory cell array 330 in response to a page read command, the memory interface circuitry 310 may transmit a ready/busy output signal nR/B indicating a busy state (e.g., a low level) to the memory controller 400. For example, while the memory device 300 is programming data DATA to the memory cell array 330 in response to a program command, the memory interface circuitry 310 may transmit a ready/busy output signal nR/B indicating the busy state to the memory controller 400.

The control logic circuitry 320 may control all operations of the memory device 300. The control logic circuitry 320 may receive the command/address CMD/ADDR obtained from the memory interface circuitry 310. The control logic circuitry 320 may generate control signals for controlling other components of the memory device 300 in response to the received command/address CMD/ADDR. For example, the control logic circuitry 320 may generate various control signals for programming data DATA to the memory cell array 330 or reading the data DATA from the memory cell array 330.

The memory cell array 330 may store the data DATA obtained from the memory interface circuitry 310, via the control of the control logic circuitry 320. The memory cell array 330 may output the stored data DATA to the memory interface circuitry 310 via the control of the control logic circuitry 320.

The memory cell array 330 may include a plurality of memory cells. For example, the plurality of memory cells may be flash memory cells. However, the inventive concept is not limited thereto, and the memory cells may be RRAM cells, FRAM cells, PRAM cells, thyristor RAM (TRAM) cells, or MRAM cells. Hereinafter, an embodiment in which the memory cells are NAND flash memory cells will mainly be described.

The memory controller 400 may include first to eighth pins P21 to P28 and a controller interface circuitry 410. The first to eighth pins P21 to P28 may respectively correspond to the first to eighth pins P11 to P18 of the memory device 300.

The controller interface circuitry 410 may transmit a chip enable signal nCE to the memory device 300 through the first pin P21. The controller interface circuitry 410 may transmit and receive signals to and from the memory device 300, which is selected by the chip enable signal nCE, through the second to eighth pins P22 to P28.

The controller interface circuitry 410 may transmit the command latch enable signal CLE, the address latch enable signal ALE, and the write enable signal nWE to the memory device 300 through the second to fourth pins P22 to P24. The controller interface circuitry 410 may transmit or receive the data signal DQ to and from the memory device 300 through the seventh pin P27.

The controller interface circuitry 410 may transmit the data signal DQ including the command CMD or the address ADDR to the memory device 300 along with the write enable signal nWE, which toggles. The controller interface circuitry 410 may transmit the data signal DQ including the command CMD to the memory device 300 by transmitting a command latch enable signal CLE having an enable state. Also, the controller interface circuitry 410 may transmit the data signal DQ including the address ADDR to the memory device 300 by transmitting an address latch enable signal ALE having an enable state.

The controller interface circuitry 410 may transmit the read enable signal nRE to the memory device 300 through the fifth pin P25. The controller interface circuitry 410 may receive or transmit the data strobe signal DQS from or to the memory device 300 through the sixth pin P26.

In a data (DATA) output operation of the memory device 300, the controller interface circuitry 410 may generate a read enable signal nRE, which toggles, and transmit the read enable signal nRE to the memory device 300. For example, before outputting data DATA, the controller interface circuitry 410 may generate a read enable signal nRE, which is changed from a static state (e.g., a high level or a low level) to a toggling state. Thus, the memory device 300 may generate a data strobe signal DQS, which toggles, based on the read enable signal nRE. The controller interface circuitry 410 may receive the data signal DQ including the data DATA along with the data strobe signal DQS, which toggles, from the memory device 300. The controller interface circuitry 410 may obtain the data DATA from the data signal DQ based on a toggle time point of the data strobe signal DQS.

In a data (DATA) input operation of the memory device 300, the controller interface circuitry 410 may generate a data strobe signal DQS, which toggles. For example, before transmitting data DATA, the controller interface circuitry 410 may generate a data strobe signal DQS, which is changed from a static state (e.g., a high level or a low level) to a toggling state. The controller interface circuitry 410 may transmit the data signal DQ including the data DATA to the memory device 300 based on toggle time points of the data strobe signal DQS.

The controller interface circuitry 410 may receive a ready/busy output signal nR/B from the memory device 300 through the eighth pin P28. The controller interface circuitry 410 may determine state information of the memory device 300 based on the ready/busy output signal nR/B.

Figure 7:
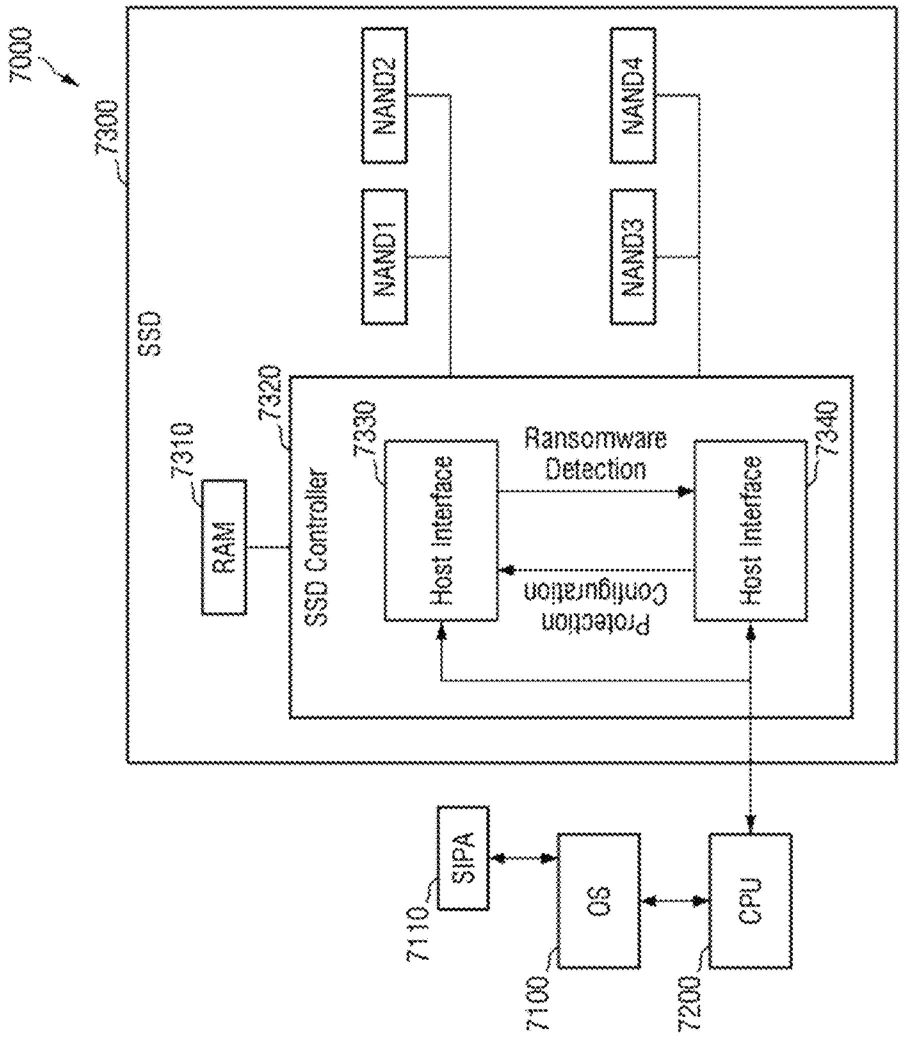
FIG. 7 is a block diagram of a storage system, according to embodiments.

FIG. 7 is an example of a storage system 7000, according to embodiments. The storage system 7000 may include a CPU 7200 which may be used to operate an operating system (OS) 7100, and may include an SSD 7300. In embodiments, the CPU 7200 may correspond to, for example, the main processor 1100, the CPU core 1110, the host controller 110, the UFS host controller 2110, or any other element discussed above. In embodiments, the SSD 7300 may correspond to the storage devices 1300*a* and 1300*b*, the storage device 200, the memory system the memory system 20, the memory device 300, or any other element discussed above. Although the SSD 7300 is illustrated as an SSD, embodiments may also be applied to any other type of storage device, for example a UFS storage device such as the UFS device 2200, or any other storage device such as an eMMC storage device. In embodiments, the CPU 7200 may communicate with a storage device, for example the SSD 7300, using a communication pathway such as a PCIe bus, however embodiments are not limited thereto, and CPU 7200 may communicate with any type of storage device over any type of connection.

The SSD 7300 may include a RAM 7310, an SSD controller 7320, and one or more memory devices such as NAND flash memory devices NAND1, NAND2, NAND3, and NAND4. In embodiments, the RAM 7310 may correspond to the buffer memory 216, the device memory 2240, or any other element discussed above. In embodiments, the SSD controller 7320 may correspond to the STRG CTRL 1310*a* and 1310*b*, the STRG CTRL 210, memory controller 16, the UFS device controller 2210, the memory controller 400, or any other element described above. In embodiments, the memory devices NAND1, NAND2, NAND3, and NAND4 may correspond to the NVMs 1320*a* and 1320*b*, the NVM 220, the NVM devices NVM11-NVMmn, the memory device 300, the NVM 2220, or any other element described above.

In embodiments, the SSD controller 7320 may include a storage internal protection (SIP) module 7330 and a host interface 7340, however embodiments are not limited thereto. In embodiments, one or more of the SIP module 7330 and the host interface 7340 may be implemented separately from the SSD controller 7320. In embodiments, the host interface 7340 may correspond to the host interface 211, the UIC layer 2250, or any other element discussed above.

In embodiments, the SIP module 7330 may be used to provide protection from malicious ransomware attacks. In embodiments, the SIP module 7330 may include, for example, a neural-network (NN) processor which may perform one or more functions of the SIP 7330. In embodiments, the NN processor may be, for example, a general purpose NN processor which may execute software code or firmware code, for example firmware code for providing protection from ransomware or other malware.

In embodiments, all of the storage commands, which may be for example NVMe commands, which are passed from the CPU 7200 to the host interface 7340 may be sniffed and processed in the SIP module 7330 in parallel to their processing in the host interface 7340. In embodiments, the SIP module 7330 may sniff the NVMe communication and detect ransomware activity. The SIP module 7330 may generate an alert or notification which may be provided to the CPU 7200. Although FIG. 7 shows the SIP module 7330 as being included in the SSD 7300, embodiments are not limited thereto, and SIP module 7330 may be included in any type of storage device.

In embodiments, a user of the CPU 7200 may receive the alert or notification, or information about the alert or notification, through a Storage Internal Protection Application (SIPA) 7110. In embodiments, the SIPA 7110 may also allow the user to configure or otherwise modify an operation of the SIP module 7330. For example, using the SIPA 7110, the user may specify types or amounts of read operations, encryption operations, and write operations, or combinations thereof, that are allowed using the storage system 7000, if any, and may specify types or amounts of read operations, encryption operations, and write operations, or combinations thereof, which may not be allowed using the storage system 7000, and which therefore may cause an alert or notification to be triggered.

In embodiments a ransomware operation may include a sequence or pattern of reading data, encrypting data, and overwriting the original data using the encrypted data. However, sometimes a legitimate operation may also include such a sequence. Accordingly, in embodiments, an alert or notification may be triggered for both malicious operations and legitimate operations, in order to provide the user with information regarding a health of the storage device 7000 or the SSD 7300.

In embodiments, one or both of the SIP module 7330 and the SIPA 7110 may allow the user or owner of the storage system 7000 or SSD 7300 to avoid malicious ransomware activity, and to therefore avoid loss or theft of data stored on the device.

In embodiments, the SIP module 7330 may detect the ransomware activity using metadata of the storage commands, which may be for example NVMe commands. For example, the SIP module 7330 may analyze an operation code (opcode) of one or more commands, a starting logical block address (SLBA) of one or more storage commands, a number of logical blocks (NLB) corresponding to one or more storage commands, and a queue identifier (QID) of one or more storage commands.

Figure 8:
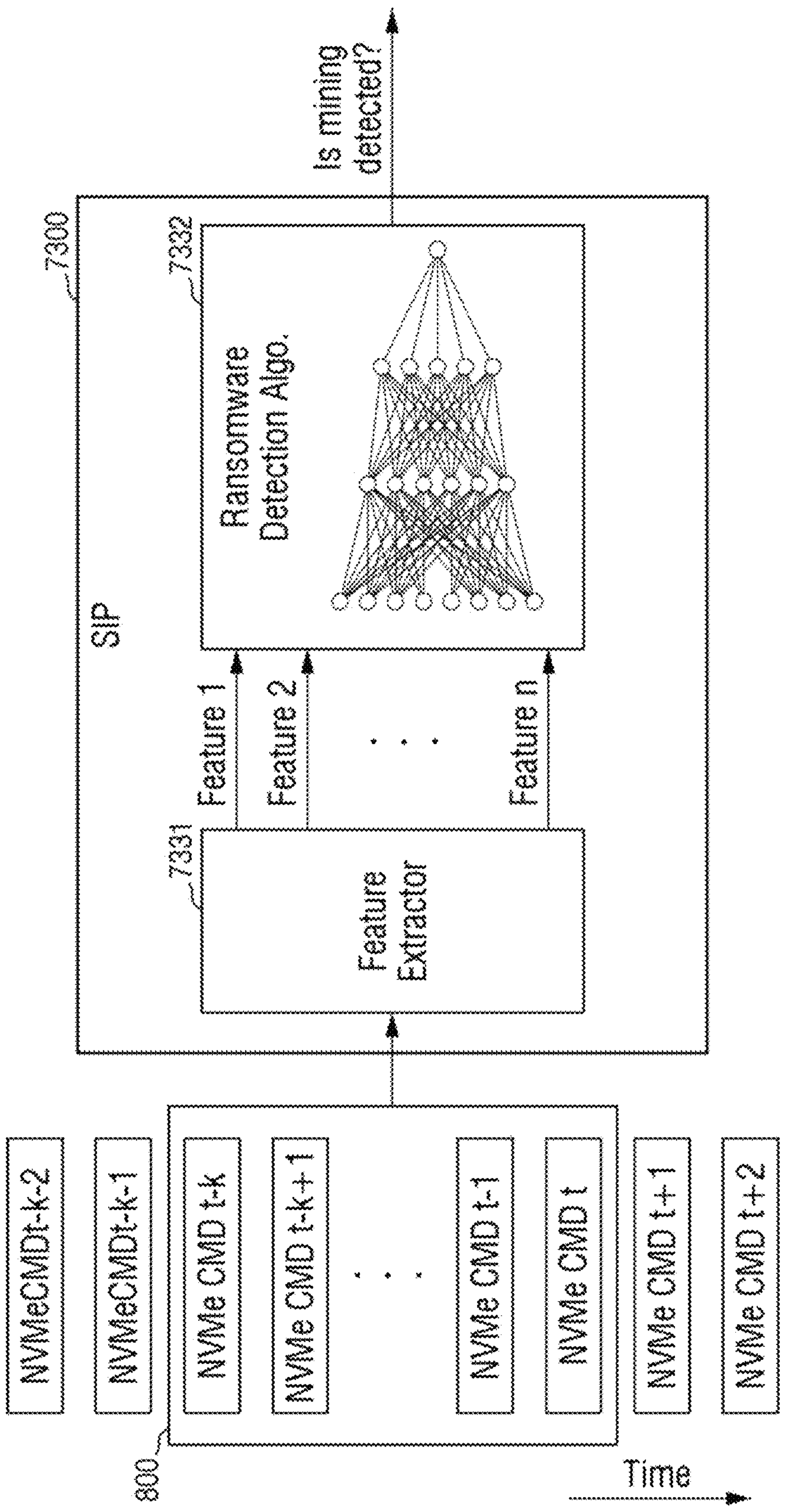
FIG. 8 is a block diagram of a logical flow of a ransomware detection system, according to embodiments.

FIG. 8 shows an example of a logical flow of a ransomware detection mechanism used by the SIP module 7330, according to embodiments. In embodiments, the SIP module 7330 may include a feature extractor 7331, which may receive a plurality of storage commands and provide a plurality of extracted features to a ransomware detection algorithm 7332. In embodiments, the feature extractor 7331 may take as input a sequence of the recent commands included in a sliding window of the overall received storage commands. For example the SIP module 7330 may receive a plurality of NVMe commands including NVMe CMD t-k−2 through NVMe CMD t+2, and may filter the plurality of NVMe commands using a sliding window 800). As a result, the feature extractor 7331 may receive as input NVMe CMD t-k through NVMe CMD t, and may extract features such as Feature 1 through Feature n to be used as input by the ransomware detection algorithm 7332. In embodiments, the feature extractor 7331 may perform additional filtering. For example, based on metadata of the plurality of NVMe commands, the feature extractor may only extract features of NVMe commands having an opcode indicating a particular type of command. In embodiments, the feature extractor 7331 may receive all of the NVMe commands and may perform filtering on all of the NVMe commands, or may apply the sliding window and/or provide additional filtering on the NVMe commands.

In embodiments, the feature extractor 7331 may extract features which may be relevant to ransomware activity detection. In embodiments, the feature extractor 7331 may perform feature extraction on blocks of commands, or individual commands (which may mean for example that the sliding window 800 may be a single command). In embodiments, the features which are extracted using feature extractor 7331 may relate to multiple commands. For example, the features which are extracted using feature extractor 7331 may relate to a time difference between commands, for example a timing difference between one or more of a read operation, a modify operation, and a write operation, a pattern in the commands, for example a pattern of a read operation, an encryption operation, and a write operation at a location of the read operation, how much time is present between commands, whether a large block of commands are received at small time intervals, or any other feature as desired. In embodiments, the features may correspond to a timing and order of read requests, write requests, and SLBA ranges of the corresponding commands. In embodiments, the features may correspond to the occurrence of a pattern such as a write command occurring after a read command, a write volume of the write command, and a sequence length of the write command.

In embodiments, the ransomware detection algorithm 7332 may be a machine learning ransomware detection algorithm which may be trained to receive a plurality of features and output a binary result, for example a signal indicating whether crypto-mining detected or not. In embodiments, the ransomware detection algorithm 7332 may include a neural network such as a convolutional neural network (CNN), a recurrent neural network (RNN), a classical algorithm such as a principle component analysis model, a random forests model, an algorithm for 1+ specification, or any other type of algorithm. In embodiments, the ransomware detection algorithm 7332 may be implemented or executed, in whole or in part, by the NN processor included in the SIP module 7330. For example, the software code or firmware code may be used to program the NN processor to implement or execute the ransomware detection algorithm 7332. In embodiments, the SIP module 7330 may receive an update, for example a software update or a firmware update, which may provide an updated version of the ransomware detection algorithm 7332. The update may be distributed based on new ransomware or malware threats and/or new ransomware or malware protections, and the updated ransomware detection algorithm 7332 may have the capability to detect or otherwise protect against the new ransomware or malware threats and/or implement the new ransomware or malware protections. For example, in embodiments the ransomware detection algorithm 7332 may be trained to detect the new ransomware or malware threats.

In embodiments, the ransomware detection algorithm 7332 may decide whether ransomware activity is detected or not, based on its internal memory and the set of features extracted from the storage commands that are currently inside the sliding window 800, and may provide an indication which may be used to generate an alert or notification.

Figure 9:
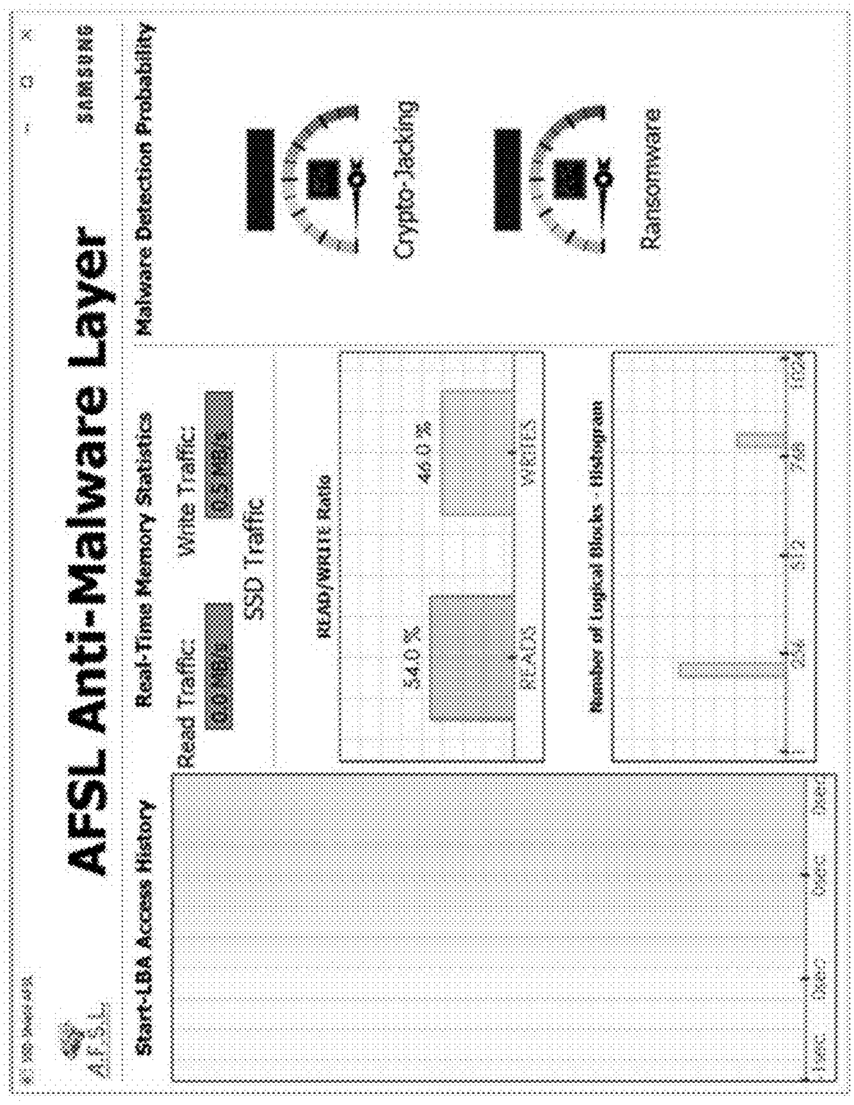
FIG. 9 illustrates a user interface screen of a storage internal protection application, according to embodiments.

FIG. 9 illustrates an example of a user interface screen associated with a SIPA 7110, according to embodiments. As can be seen in FIG. 9, the user interface screen may include an indication that malware-related activity, such as a ransomware operation or a crypto-jacking operation, has been detected. In addition, in embodiments the user interface screen may provide additional information, for example a probability level associated with the ransomware operation or the crypto-jacking operation, memory statistics such as read traffic or write traffic corresponding to the SSD 7300, a histogram indicating NLBs associated with recent commands, and an access history of SLBAs associated with recent commands.

Figure 10:
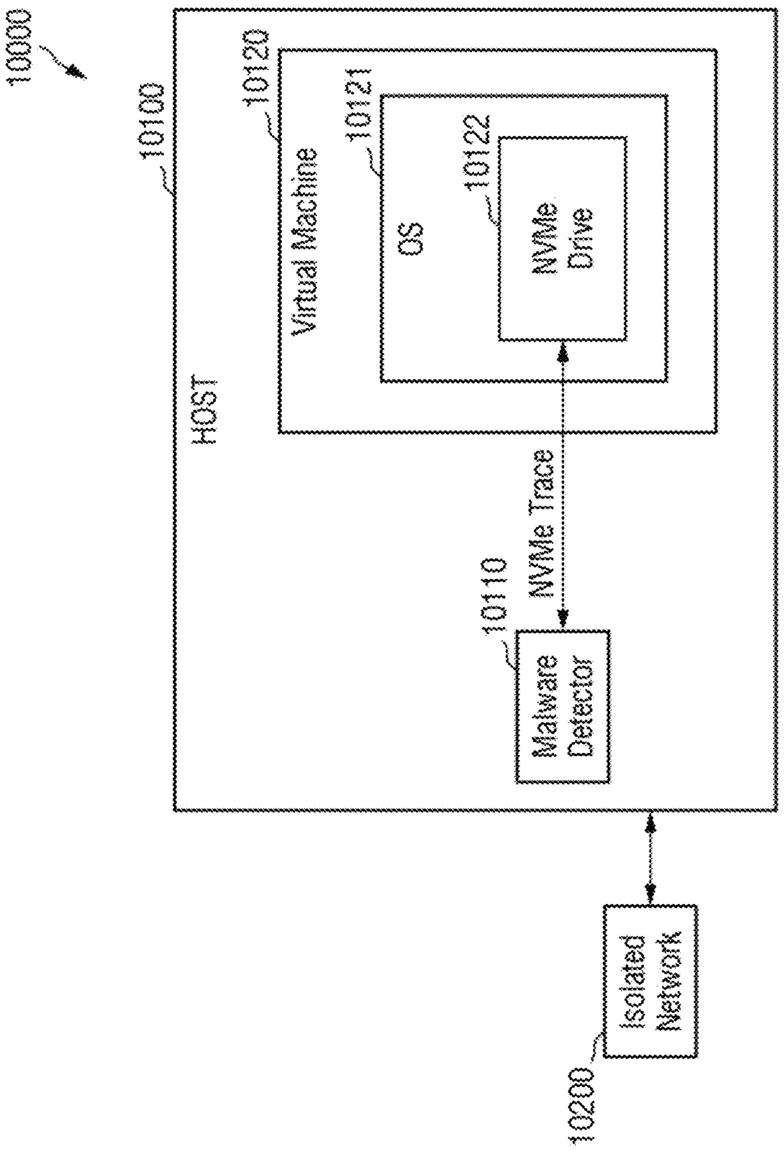
FIG. 10 illustrates a block diagram of a training environment for training and testing a ransomware detection algorithm, according to embodiments.

FIG. 10 illustrates a block diagram of a training environment 10000 which may be used to train the ransomware detection algorithm 7332, according to embodiments. In embodiments, the ransomware detection algorithm 7332 may be trained using ransomware variants which may be found "in the wild", for example real-world examples of ransomware. However, introducing such malicious code into a sensitive environment presents a number of risks. Therefore, the training environment may include a host 10100 which may be connected to an isolated network 10200. In embodiments, the host 10100 may include a virtual machine 10120, which may use an operating system (OS) 10121. In embodiments, the OS 10121 may be a personal computer OS, for example, Microsoft Windows, Apple iOS, or Unix, a mobile device OS such as Android, or any other OS as desired. In embodiments, the OS 10121 may be used to operate a simulated version of the firmware associated with an NVMe drive 10122. In embodiments, the host may also include a malware detector 10110, which may include a machine-learning algorithm corresponding to ransomware detection algorithm 7332, and which may receive storage commands such as NVMe commands from the NVMe drive 10122 over an NVMe trace.

In embodiments, training environment 10000 may be used to provide training datasets which may include NVMe logs for training and testing ransomware detection algorithm 7332. For example, the training dataset may include two sets, which may be referred to as a ransomware set and a goodware set. The ransomware set may include NVMe logs generated using real-world ransomware examples, such as REvil, Darkside, DHARMA, Conti, RansomEXX, Maze, CTBLocker, and CryptoDefense. For example, the ransomware set may be generated by infecting the virtual machine 10120 with the ransomware examples and reading the associated NVMe commands. The goodware set may include NVMe logs generated using examples of different legitimate user scenarios, such as secretarial work, file operations, gaming, web-browsing, and coding. For example, the goodware set may be generated by performing the legitimate user scenarios using the virtual machine 10120 and reading the associated NVMe commands. In embodiments, the training dataset may include a mixture of the ransomware dataset and the goodware dataset, which may simulate ransomware attacks on different types of users.

Figure 11:
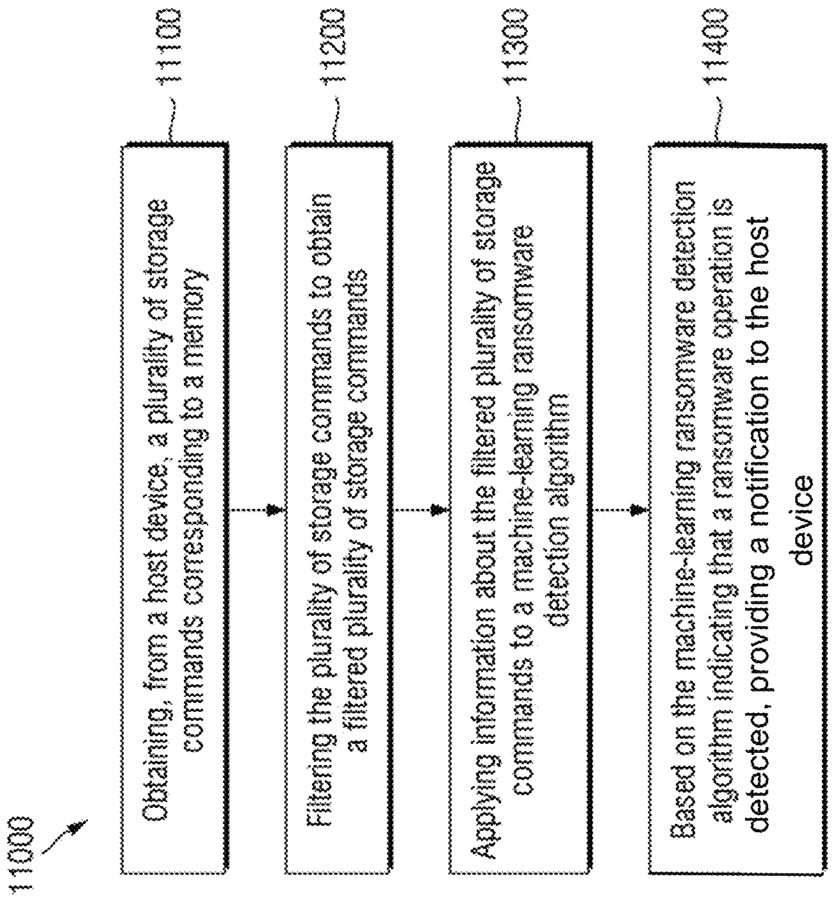
FIG. 11 is a flowchart of a process of controlling a storage system, according to embodiments.

FIG. 11 is a flowchart of a process 11000 of controlling a storage device, according to embodiments. In some implementations, one or more process blocks of FIG. 11 may be performed by the SIP module 7330 or any other element described above with reference to FIGS. 1-10.

As shown in FIG. 11, at operation 11100 the process 11000 may include obtaining, from a host device, a plurality of storage commands corresponding to a memory. In embodiments, the host device may correspond to the CPU 7200, the host 110, the UFS host 2100, or any other element described above with reference to FIGS. 1-10.

As further shown in FIG. 11, at operation 11200 the process 11000 may include filtering the plurality of storage commands to obtain a filtered plurality of storage commands.

As further shown in FIG. 11, at operation 11300 the process 11000 may include applying information about the filtered plurality of storage commands to a machine-learning ransomware detection algorithm. In embodiments, the machine-learning ransomware detection algorithm may correspond to the ransomware detection algorithm 7332.

As further shown in FIG. 11, at operation 11400 the process 11000 may include, based on the machine-learning crypto-mining detection algorithm indicating that a ransomware operation is detected, providing a notification to the host device.

In embodiments, the SIP module may further include a neural-network (NN) processor configured to execute malware protection firmware code to implement the machine-learning ransomware detection algorithm, and the SIP module may be further configured to obtain an update for the malware protection firmware code; update the malware protection firmware code based on the update; apply new information about a new filtered plurality of storage commands to an updated machine-learning ransomware detection algorithm corresponding to the updated malware detection firmware code; and based on the updated machine-learning ransomware detection algorithm indicating that a new ransomware operation is detected, provide the notification to the host device.

In embodiments, the storage device may include an including an SSD controller configured to receive the plurality of storage commands and perform operations on the memory based on the plurality of storage commands, wherein the SSD controller includes at least one processor configured to perform the process 11000. In embodiments, the process 11000 may be performed by hardware that is not a processor. For example, the SIP module 7330 may be implemented by a circuit or other hardware that does not include a processor, and the process 10000 may be performed by the SIP module 7330.

In embodiments, the plurality of storage commands may include at least one nonvolatile memory express (NVMe) command.

In embodiments, the filtered plurality of storage commands may be obtained by applying a sliding window having a predetermined size to the plurality of storage commands.

In embodiments, the information about the filtered plurality of storage commands may be obtained by extracting a plurality of features from metadata corresponding to the plurality of storage commands.

In embodiments, a feature of the plurality of features may include at least one from among an operation code corresponding to a storage command from among the plurality of storage commands, a number of logical blocks corresponding to the storage command, and a queue identifier corresponding to the storage command. However, embodiments are not limited thereto, and the plurality of features may include any other type of feature.

In embodiments, the plurality of storage commands may be filtered based on the extracted plurality of features, and the information about the filtered plurality of storage commands may include a filtered plurality of features corresponding to the filtered plurality of storage commands.

In embodiments, the machine-learning ransomware detection algorithm may include at least one from among a convolutional neural network, a recurrent neural network, a principal component analysis model, and a random forests model.

In embodiments, the machine-learning ransomware detection algorithm may be configured to identify the ransomware operation based on a pattern associated with the filtered plurality of storage commands, and the pattern may relate to at least one from among a first storage command corresponding to a read operation for reading data, a second storage command corresponding to an encryption operation for encrypting the data to generate encrypted data, and a third storage command corresponding to a write operation for overwriting the data using the encrypted data.

In embodiments, the host device may be configured to operate a SIP application (SIPA) corresponding to the SIP module, and the process 11000 may further include providing an alert to a user of the host device based on the notification, and receiving a user input received from the user, and modifying an operation of the SIP module 7330 based on the user input. In embodiments, the SIPA may correspond to SIPA 7110.

Although FIG. 11 shows example blocks of process 11000, in some implementations, the process 11000 may include additional blocks, fewer blocks, different blocks, or differently arranged blocks than those depicted in FIG. 11. Additionally, or alternatively, two or more of the blocks of the process 11000 may be arranged or combined in any order, or performed in parallel.

Figure 12:
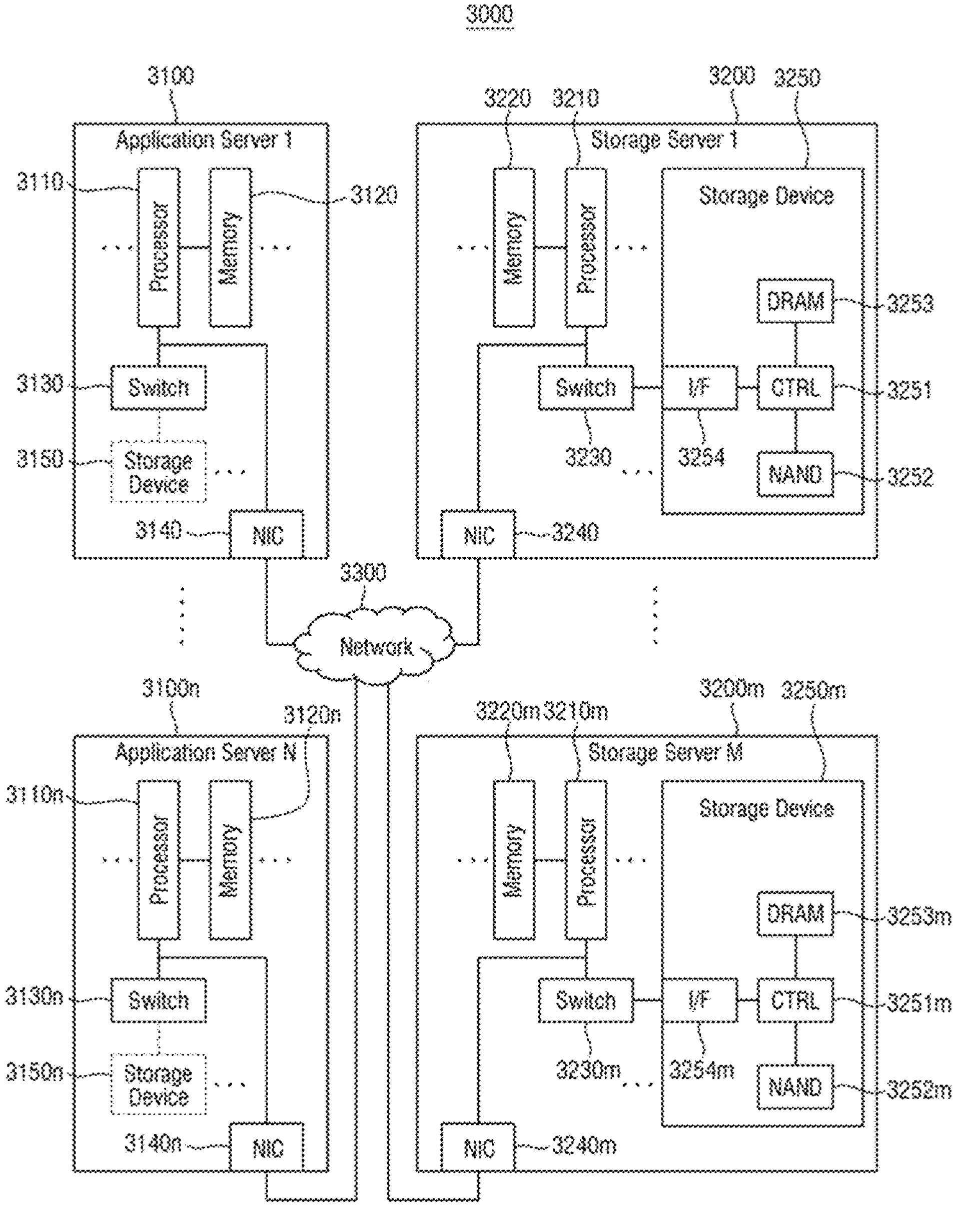
FIG. 12 is a block diagram of data center, according to embodiments.

FIG. 12 is a diagram of a data center 3000 to which a memory device is applied, according to embodiments.

Referring to FIG. 12, the data center 3000 may be a facility that collects various types of pieces of data and provides services and be referred to as a data storage center. The data center 3000 may be a system for operating a search engine and a database, and may be a computing system used by companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to embodiments. The number of application servers 3100 to 3100*n* may be different from the number of storage servers 3200 to 3200*m*.

The application server 3100 or the storage server 3200 may include at least one of processors 3110 and 3210 and memories 3120 and 3220. The storage server 3200 will now be described as an example. The processor 3210 may control all operations of the storage server 3200, access the memory 3220, and execute instructions and/or data loaded in the memory 3220. The memory 3220 may be a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In embodiments, the processor 3210 and the memory 3220 may provide a processor-memory pair. In embodiments, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

The application servers 3100 to 3100*n* may communicate with the storage servers 3200 to 3200*m* through a network 3300. The network 3300 may be implemented by using a fiber channel (FC) or Ethernet. In this case, the FC may be a medium used for relatively high-speed data transmission and use an optical switch with high performance and high availability. The storage servers 3200 to 3200*m* may be provided as file storages, block storages, or object storages according to an access method of the network 3300.

In embodiments, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100*n*, and a description of the storage server 3200 may be applied to another storage server 3200*m*.

The application server 3100 may store data, which is requested by a user or a client to be stored, in one of the storage servers 3200 to 3200*m* through the network 3300. Also, the application server 3100 may obtain data, which is requested by the user or the client to be read, from one of the storage servers 3200 to 3200*m* through the network 3300. For example, the application server 3100 may be implemented as a web server or a database management system (DBMS).

The application server 3100 may access a memory 3120*n* or a storage device 3150*n*, which is included in another application server 3100*n*, through the network 3300. Alternatively, the application server 3100 may access memories 3220 to 3220*m* or storage devices 3250 to 3250*m*, which are included in the storage servers 3200 to 3200*m*, through the network 3300. Thus, the application server 3100 may perform various operations on data stored in application servers 3100 to 3100*n* and/or the storage servers 3200 to 3200*m*. For example, the application server 3100 may execute an instruction for moving or copying data between the application servers 3100 to 3100*n* and/or the storage servers 3200 to 3200*m*. In this case, the data may be moved from the storage devices 3250 to 3250*m* of the storage servers 3200 to 3200*m* to the memories 3120 to 3120*n* of the application servers 3100 to 3100*n* directly or through the memories 3220 to 3220*m* of the storage servers 3200 to 3200*m*. The data moved through the network 3300 may be data encrypted for security or privacy.

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC(Network InterConnect) 3240. The switch 3230 may selectively connect the processor 3210 to the storage device 3250 or selectively connect the NIC 3240 to the storage device 3250 via the control of the processor 3210.

In embodiments, the NIC 3240 may include a network interface card and a network adaptor. The NIC 3240 may be connected to the network 3300 by a wired interface, a wireless interface, a Bluetooth interface, or an optical interface. The NIC 3240 may include an internal memory, a digital signal processor (DSP), and a host bus interface and be connected to the processor 3210 and/or the switch 3230 through the host bus interface. The host bus interface may be implemented as one of the above-described examples of the interface 3254. In embodiments, the NIC 3240 may be integrated with at least one of the processor 3210, the switch 3230, and the storage device 3250.

In the storage servers 3200 to 3200*m* or the application servers 3100 to 3100*n*, a processor may transmit a command to storage devices 3150 to 3150*n* and 3250 to 3250*m* or the memories 3120 to 3120*n* and 3220 to 3220*m* and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150*n* and 3250 to 3250*m* may transmit a control signal and a command/address signal to NAND flash memory devices 3252 to 3252*m* in response to a read command received from the processor. Thus, when data is read from the NAND flash memory devices 3252 to 3252*m*, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

The controller 3251 may control all operations of the storage device 3250. In embodiments, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210*m* of another storage server 3200*m*, or the processors 3110 and 3110*n* of the application servers 3100 and 3100*n*. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of the embodiments and is not to be construed as limiting thereof. Although a few embodiments have been described, those skilled in the art will readily appreciate that many modifications are possible in the embodiments without materially departing from the present scope.

What is claimed is:

1. A storage system, comprising:

a host device; and a storage device comprising a memory and at least one processor configured to:

obtain, from the host device, a plurality of storage commands corresponding to the memory, filter the plurality of storage commands to obtain a filtered plurality of storage commands, apply information about the filtered plurality of storage commands to a machine-learning ransomware detection algorithm implemented using malware protection firmware code, based on the machine-learning ransomware detection algorithm indicating that a ransomware operation is detected, provide a notification to the host device, update the malware protection firmware code, apply new information about a new filtered plurality of storage commands to an updated machine-learning ransomware detection algorithm corresponding to the updated malware protection firmware code, and based on the updated machine-learning ransomware detection algorithm indicating that a new ransomware operation is detected, provide the notification to the host device.

2. The storage system of claim 1, wherein the at least one processor further comprises a neural-network (NN) processor configured to execute the malware protection firmware code to implement the machine-learning ransomware detection algorithm.

3. The storage system of claim 1, wherein the storage device comprises a solid state drive (SSD) including an SSD controller configured to receive the plurality of storage commands and perform operations on the memory based on the plurality of storage commands, wherein the at least one processor is included in the SSD controller, and wherein the plurality of storage commands includes at least one nonvolatile memory express (NVMe) command.

4. The storage system of claim 3, wherein the SSD controller further comprises a host interface configured to receive the plurality of storage commands from the host device, and wherein the at least one processor and the host interface are configured to process the plurality of storage commands in parallel.

5. The storage system of claim 1, wherein the filtered plurality of storage commands is obtained by applying a sliding window having a predetermined size to the plurality of storage commands.

6. The storage system of claim 1, wherein the machine-learning ransomware detection algorithm is configured to identify the ransomware operation based on a pattern associated with the filtered plurality of storage commands, and wherein the pattern relates to at least one from among a first storage command corresponding to a read operation for reading data, a second storage command corresponding to an encryption operation for encrypting the data to generate encrypted data, and a third storage command corresponding to a write operation for overwriting the data using the encrypted data.

7. The storage system of claim 1, wherein the machine-learning ransomware detection algorithm comprises at least one from among a convolutional neural network, a recurrent neural network, a principal component analysis model, and a random forests model.

8. The storage system of claim 1, wherein the host device is configured to operate a SIP application (SIPA), wherein the SIPA is configured to provide an alert to a user of the host device based on the notification, and to receive a user input received from the user, and wherein the at least one processor is further configured to modify an operation of the at least one processor based on the user input.

9. A storage device, comprising:

a memory; and at least one processor configured to:

obtain a plurality of storage commands corresponding to the memory, filter the plurality of storage commands to obtain a filtered plurality of storage commands, apply information about the filtered plurality of storage commands to a machine-learning ransomware detection algorithm implemented using malware protection firmware code, based on the machine-learning ransomware detection algorithm indicating that a ransomware operation is detected, provide a notification to a user of the storage device, update the malware protection firmware code, apply new information about a new filtered plurality of storage commands to an updated machine-learning ransomware detection algorithm corresponding to the updated malware protection firmware code, and based on the updated machine-learning ransomware detection algorithm indicating that a new ransomware operation is detected, provide the notification to the user of the storage device.

10. The storage device of claim 9, wherein the storage device comprises a solid state drive (SSD) including an SSD controller configured to receive the plurality of storage commands and perform operations on the memory based on the plurality of storage commands, wherein the at least one processor is included in the SSD controller, and wherein the plurality of storage commands includes at least one nonvolatile memory express (NVMe) command.

11. The storage device of claim 9, wherein the filtered plurality of storage commands is obtained by applying a sliding window having a predetermined size to the plurality of storage commands.

12. The storage device of claim 9, wherein the at least one processor is further configured to obtain the information about the filtered plurality of storage commands by extracting a plurality of features from metadata corresponding to the plurality of storage commands.

13. The storage device of claim 12, wherein a feature of the plurality of features comprises at least one from among an operation code corresponding to a storage command from among the plurality of storage commands, a starting logical block address corresponding to the storage command, and a queue identifier corresponding to the storage command.

14. The storage device of claim 12, wherein the at least one processor is further configured to filter the plurality of storage commands based on the extracted plurality of features, and wherein the information about the filtered plurality of storage commands comprises a filtered plurality of features corresponding to the filtered plurality of storage commands.

15. The storage device of claim 9, wherein the machine-learning ransomware detection algorithm comprises at least one from among a convolutional neural network, a recurrent neural network, a principal component analysis model, and a random forests model.

16. A method of controlling a storage system, the method being performed by at least one processor included in a storage device of the storage system, the method comprising:

obtaining, from a host device included in the storage system, a plurality of storage commands corresponding to a memory of the storage device, filtering the plurality of storage commands to obtain a filtered plurality of storage commands, applying information about the filtered plurality of storage commands to a machine-learning ransomware detection algorithm implemented using malware protection firmware code, based on the machine-learning ransomware detection algorithm indicating that a ransomware operation is detected, providing a notification to the host device, updating the malware protection firmware code; and applying new information about a new filtered plurality of storage commands to an updated machine-learning ransomware detection algorithm corresponding to the updated malware protection firmware code; and based on the updated machine-learning ransomware detection algorithm indicating that a new ransomware operation is detected, providing the notification to the host device.

17. The method of claim 16, wherein the storage device comprises a solid state drive (SSD) including an SSD controller configured to receive the plurality of storage commands and perform operations on the memory based on the plurality of storage commands, wherein the at least one processor is included in the SSD controller, and wherein the plurality of storage commands includes at least one nonvolatile memory express (NVMe) command.

18. The method of claim 17, wherein the SSD controller further comprises a host interface configured to receive the plurality of storage commands from the host device, and wherein the method further comprises processing the plurality of storage commands using the at least one processor and the host interface in parallel.

19. The method of claim 16, wherein the filtered plurality of storage commands is obtained by applying a sliding window having a predetermined size to the plurality of storage commands.

20. The method of claim 16, wherein the machine-learning ransomware detection algorithm is configured to identify the ransomware operation based on a pattern associated with the filtered plurality of storage commands, and wherein the pattern relates to at least one from among a first storage command corresponding to a read operation for reading data, a second storage command corresponding to an encryption operation for encrypting the data to generate encrypted data, and a third storage command corresponding to a write operation for overwriting the data using the encrypted data.

* * * * *